(12) United States Patent
Hassett

(10) Patent No.: US 9,095,194 B2
(45) Date of Patent: Aug. 4, 2015

(54) PROTECTIVE CASE FOR AN ELECTRONIC DEVICE

(71) Applicant: Thule Organization Solutions, Inc., Longmont, CO (US)

(72) Inventor: Eric Sheldon Hassett, Golden, CO (US)

(73) Assignee: Thule Organization Solutions, Inc., Longmont, CO (US)

( * ) Notice: Subject to any disclaimer, the term of this patent is extended or adjusted under 35 U.S.C. 154(b) by 0 days.

(21) Appl. No.: 14/104,286

(22) Filed: Dec. 12, 2013

(65) Prior Publication Data

US 2014/0158583 A1   Jun. 12, 2014

Related U.S. Application Data

(60) Provisional application No. 61/736,434, filed on Dec. 12, 2012.

(51) Int. Cl.
*A45C 11/00* (2006.01)
*G06F 1/16* (2006.01)

(52) U.S. Cl.
CPC .............. *A45C 11/00* (2013.01); *G06F 1/1626* (2013.01); *A45C 2011/003* (2013.01); *A45C 2200/15* (2013.01); *G06F 2200/1633* (2013.01)

(58) Field of Classification Search
CPC .... A45C 11/00; A45C 13/1069; A45C 13/34; A45C 2011/002; A45C 2011/003; A45C 2200/15; G06F 1/1628
USPC ............. 206/45.2–45.26, 305, 320, 472, 756; 248/176.1, 447–460, 465.1, 918; 361/679.56, 679.59; 455/575.1, 575.6, 455/575.8
See application file for complete search history.

(56) References Cited

U.S. PATENT DOCUMENTS

| | | |
|---|---|---|
| 1,613,536 A | 1/1927 | Rose |
| 2,390,125 A | 12/1945 | Stanley |
| 2,490,356 A | 12/1949 | Hummel |
| 2,505,743 A | 4/1950 | Rose |
| 2,537,135 A | 1/1951 | Hempel |
| 3,041,774 A | 7/1962 | Walker |
| 3,334,920 A | 8/1967 | Orth |
| D230,376 S | 2/1974 | Andrew |

(Continued)

FOREIGN PATENT DOCUMENTS

| | | |
|---|---|---|
| EP | 2564722 | 3/2013 |
| GB | 2500947 | 10/2013 |

(Continued)

OTHER PUBLICATIONS

International Preliminary Report on Patentability for International (PCT) Patent Application No. PCT/US2012/070974, dated Jul. 3, 2014 9 pages.

(Continued)

*Primary Examiner* — Bryon Gehman
*Assistant Examiner* — Brijesh V. Patel
(74) *Attorney, Agent, or Firm* — Sheridan Ross P.C.

(57) ABSTRACT

A protective case for accommodating at least one electronic device is provided. The case comprises internal features including an articulating support member to allow the selective orientation and positioning of the electrical device in one of at least three user-selected positions and also allows for the nesting of the electronic device in either the closed or open position.

15 Claims, 7 Drawing Sheets

(56) References Cited

U.S. PATENT DOCUMENTS

| | | | |
|---|---|---|---|
| 4,213,520 A | 7/1980 | Sarna et al. | |
| 4,259,568 A | 3/1981 | Dynesen | |
| 4,544,123 A | 10/1985 | Peacock | |
| 4,555,128 A | 11/1985 | White et al. | |
| 5,607,054 A | 3/1997 | Hollingsworth | |
| D396,489 S | 7/1998 | Siemon et al. | |
| D420,385 S | 2/2000 | Inbert | |
| 6,155,602 A | 12/2000 | Mylander et al. | |
| 6,308,988 B1 | 10/2001 | Mylander et al. | |
| 6,772,879 B1 | 8/2004 | Domotor | |
| 7,184,263 B1 | 2/2007 | Maskatia | |
| 7,281,698 B2 | 10/2007 | Patterson, Jr. | |
| 7,414,833 B2 | 8/2008 | Kittayapong | |
| 7,540,378 B2 | 6/2009 | Gallagher | |
| 7,573,703 B2 * | 8/2009 | Chuang et al. | 361/679.27 |
| 7,735,644 B2 | 6/2010 | Sirichai et al. | |
| 7,828,260 B2 | 11/2010 | Hauser et al. | |
| D658,186 S | 4/2012 | Akana et al. | |
| D658,188 S | 4/2012 | Diebel | |
| D659,139 S | 5/2012 | Gengler | |
| D663,304 S | 7/2012 | Akana et al. | |
| 8,230,992 B2 | 7/2012 | Law et al. | |
| 8,245,843 B1 | 8/2012 | Wu | |
| 8,281,924 B2 | 10/2012 | Westrup | |
| 8,312,991 B2 | 11/2012 | Diebel et al. | |
| D671,948 S | 12/2012 | Akana et al. | |
| D672,353 S | 12/2012 | Liu | |
| D672,781 S | 12/2012 | Lu | |
| D673,159 S | 12/2012 | McCarthy et al. | |
| D674,798 S | 1/2013 | Kim et al. | |
| D674,800 S | 1/2013 | Kim | |
| D675,210 S | 1/2013 | Kim | |
| D675,624 S | 2/2013 | Wibby et al. | |
| D675,625 S | 2/2013 | Hasbrook et al. | |
| D675,627 S | 2/2013 | Rouser | |
| D676,449 S | 2/2013 | Probst et al. | |
| D678,260 S | 3/2013 | Bau | |
| D679,278 S | 4/2013 | Cho et al. | |
| D679,279 S | 4/2013 | Yang et al. | |
| D679,715 S | 4/2013 | Akana et al. | |
| D680,120 S | 4/2013 | Cho et al. | |
| 8,424,830 B2 | 4/2013 | Yang et al. | |
| D681,641 S | 5/2013 | Van Den Nieuwenhuizen et al. | |
| D682,836 S | 5/2013 | Akana et al. | |
| D682,838 S | 5/2013 | Akana et al. | |
| D683,141 S | 5/2013 | Symons | |
| 8,479,915 B2 | 7/2013 | Chen | |
| D687,438 S | 8/2013 | Lu | |
| D690,305 S | 9/2013 | Wen | |
| D690,702 S | 10/2013 | Chung | |
| D691,142 S | 10/2013 | Diebel | |
| D692,434 S | 10/2013 | Kim | |
| 8,567,740 B2 | 10/2013 | Tarnutzer et al. | |
| D693,823 S | 11/2013 | Chen et al. | |
| D695,296 S | 12/2013 | Hsu | |
| D696,253 S | 12/2013 | Akana et al. | |
| D696,256 S | 12/2013 | Piedra et al. | |
| D696,669 S | 12/2013 | Akana et al. | |
| 8,640,864 B2 | 2/2014 | Chen et al. | |
| 8,651,446 B2 | 2/2014 | Lausell | |
| 8,657,112 B2 | 2/2014 | Igarashi | |
| D701,205 S | 3/2014 | Akana et al. | |
| D702,673 S | 4/2014 | Murchison et al. | |
| D704,689 S | 5/2014 | Chang | |
| D704,693 S | 5/2014 | Kim | |
| D706,270 S | 6/2014 | Akana et al. | |
| D706,783 S | 6/2014 | Almodova | |
| D707,229 S | 6/2014 | Almodova | |
| 8,757,375 B2 | 6/2014 | Huang | |
| D708,838 S | 7/2014 | Lee | |
| 8,763,795 B1 | 7/2014 | Oten et al. | |
| 8,766,921 B2 | 7/2014 | Ballagas et al. | |
| 8,773,353 B2 | 7/2014 | Wei | |
| 8,783,458 B2 | 7/2014 | Gallagher et al. | |
| D710,859 S | 8/2014 | Mecchella et al. | |
| 8,797,132 B2 | 8/2014 | Childs et al. | |
| 2003/0034263 A1 | 2/2003 | D'Hoste | |
| 2003/0099503 A1 | 5/2003 | Moor | |
| 2003/0111940 A1 | 6/2003 | Lai et al. | |
| 2004/0114315 A1 * | 6/2004 | Anlauff | 361/681 |
| 2005/0103969 A1 | 5/2005 | Gaines | |
| 2005/0238415 A1 | 10/2005 | Busam et al. | |
| 2008/0037213 A1 * | 2/2008 | Haren | 361/687 |
| 2009/0159763 A1 | 6/2009 | Kim | |
| 2010/0101975 A1 * | 4/2010 | Zhang et al. | 206/701 |
| 2011/0163642 A1 | 7/2011 | Rorhbach et al. | |
| 2011/0203955 A1 | 8/2011 | Fasula | |
| 2011/0221319 A1 * | 9/2011 | Law et al. | 312/325 |
| 2011/0240516 A1 | 10/2011 | Fan | |
| 2011/0266194 A1 | 11/2011 | Bau | |
| 2011/0290687 A1 | 12/2011 | Han | |
| 2011/0297564 A1 * | 12/2011 | Kim et al. | 206/320 |
| 2011/0297566 A1 | 12/2011 | Gallagher et al. | |
| 2012/0037523 A1 | 2/2012 | Diebel et al. | |
| 2012/0043234 A1 * | 2/2012 | Westrup | 206/320 |
| 2012/0044638 A1 | 2/2012 | Mongan et al. | |
| 2012/0097831 A1 * | 4/2012 | Olukotun et al. | 248/688 |
| 2012/0211377 A1 | 8/2012 | Sajid | |
| 2012/0211613 A1 | 8/2012 | Yang | |
| 2012/0305413 A1 | 12/2012 | Chung | |
| 2012/0308981 A1 | 12/2012 | Libin et al. | |
| 2012/0325689 A1 | 12/2012 | Wibby et al. | |
| 2013/0015088 A1 | 1/2013 | Wu | |
| 2013/0016467 A1 | 1/2013 | Ku | |
| 2013/0020215 A1 * | 1/2013 | Hsu | 206/320 |
| 2013/0020216 A1 | 1/2013 | Chiou | |
| 2013/0048514 A1 | 2/2013 | Corcoran et al. | |
| 2013/0134061 A1 | 5/2013 | Wu et al. | |
| 2013/0140203 A1 | 6/2013 | Chiang | |
| 2013/0175200 A1 | 7/2013 | Poon et al. | |
| 2013/0213838 A1 * | 8/2013 | Tsai et al. | 206/320 |
| 2013/0214661 A1 | 8/2013 | McBroom | |
| 2013/0241381 A1 | 9/2013 | Hynecek et al. | |
| 2013/0264459 A1 | 10/2013 | McCosh et al. | |
| 2013/0313142 A1 * | 11/2013 | Wen | 206/320 |

FOREIGN PATENT DOCUMENTS

| | | |
|---|---|---|
| TW | M418323 | 12/2011 |
| WO | WO 02/13659 | 2/2002 |
| WO | WO 2010036090 A2 * | 4/2010 |
| WO | WO 2011/007267 | 1/2011 |

OTHER PUBLICATIONS

Notice of Allowance for U.S. Appl. No. 13/722,167, mailed Sep. 26, 2014 10 pages.

U.S. Appl. No. 29/440,310, filed Dec. 20, 2012, Poon.

"MiniSuit Orbit 360 Rotating Stand Case for Apple iPad Devices," Amazon.com, 2012, 5 pages.

"Targus THZ045US Versavu 360 Degrees Rotating Stand Case for Apple iPad 2/3/4 (Black/Blue Interior)" Amazon.com, 2012, 7 pages.

International Search Report and Written Opinion for International (PCT) Patent Application No. PCT/US2012/070974 mailed Apr. 15, 2013, 12 pages.

"FitFolio Cases for iPad 4, 3, and 2," Speck Products, 2014, 1 page.

Official Action for U.S. Appl. No. 13/722,167 mailed Mar. 14, 2014, 9 pages.

Official Action for U.S. Appl. No. 13/722,167 mailed Apr. 28, 2014, 9 pages.

U.S. Appl. No. 29/478,664, filed Jan. 7, 2014, Hassett.

U.S. Appl. No. 29/478,649, filed Jan. 7, 2014, Hassett.

Official Action for U.S. Appl. No. 29/440,310, mailed Nov. 21, 2014 6 pages Restriction Requirement.

Official Action for U.S. Appl. No. 29/478,664, mailed Oct. 17, 2014 14 pages.

Official Action for U.S. Appl. No. 29/478,649, mailed Oct. 16, 2014 12 pages.

* cited by examiner

PROTECTIVE CASE FOR AN ELECTRONIC DEVICE

This U.S. Non-Provisional patent application claims the benefit of priority from U.S. Provisional Patent Application 61/736,434, filed Dec. 12, 2012, the entire disclosure of which is hereby incorporated by reference in its entirety.

FIELD OF THE INVENTION

The present invention relates generally to protective cases and covers for electronic devices. More specifically, the present invention relates to a folding case for accommodating a variety of electronic devices, such as tablet computers, e-readers, and other similar devices.

BACKGROUND

Portable electronic devices such as tablet computers and e-readers have become increasingly popular. An inherent convenience of these devices is that they are highly portable. With increased portability and enhanced electronics, however, comes the need to protect the device from the surrounding environment, impact, and abrasion. Accordingly, as the popularity of the devices continues to increase, so does the need and desire to protect or surround the device with a cost effective storage case. There is a need not only for protecting and transporting electronic devices, but also to use the case for the dual purpose of retaining the electronic device in a preferred orientation for viewing purposes.

SUMMARY OF THE INVENTION

Accordingly, the present invention contemplates a novel system and device for a protective case for an electronic device wherein the case is provided with features for selectively accommodating and retaining a variety of electronic devices of various shapes and/or sizes, as well as allowing the selective positioning of the device for viewing.

In various embodiments, the present invention comprises a plurality of hinges or folds, such that the case may be converted between: 1—a "closed" configuration; 2—an "open" configuration; and 3—a "propped open" or self-supported configuration. A case of the present invention may comprise at least two hinge features and at least one slot, indention, indentation, or trough, such that the case may be positioned in an open position and with a contained device residing at a predetermined angle, such as may be desirable for using the device.

In one aspect, the present invention comprises a protective case for retaining, displaying, and storing an electronic device, the case comprising a first cover portion, a second cover portion hingedly interconnected to the first cover portion by a first hinge, the second cover portion comprising a substantially rigid planar member and a second hinge, such that a portion of the second cover portion is rotatable with respect to the first cover portion about at least two parallel axes of rotation.

Another aspect of the present invention is to provide at least one slot or channel on the inside surface of the cover for engaging and retaining the substantially rigid planar member in a predetermined orientation. The predetermined orientation may position the electronic device such that it is tipped up or tilted in a reading position or other position of use.

In various aspects, protective cases of the present invention comprise various protective features including, but not limited to, rigid or hard-shell outer covers, cushioned materials, soft or non-abrasive interior portions to reduce risk of abrasion, etc.

In one embodiment, a case is provided for securing a device, such as a tablet. The tablet is positionable between at least a first position, wherein the tablet rests "screen-down" in a molded panel for safe storage and transport, and a "screen-up" position in the molded panel for handheld use. Additionally, an integrated/attached kickstand supports a device in multiple viewing angles using the molded EVA panel as a stable base. Grooves or other shapes molded into the panel create resting positions for lower edge of the device. Portions of the case are designed to interface with molded grooves without slipping. The molded panel is designed so that thickness of kickstand support nests into depressions within the panel so that the tablet rests smooth and flat within the molded panel in a plurality of positions.

In a preferred embodiment, a case for an electronic device is provided. The case comprises a first cover portion and a second cover portion wherein the device is secured within a first cover portion and the second cover portion is provided for additional protection of the device as well as providing means for displaying a device in a position of use. In certain embodiments, the second cover portion comprises a planar portion adapted for covering and protecting a planar portion of the device, such as the screen of a tablet device, and a peripheral edge portion comprising a lip for extending at least partially over at least one edge of a device and/or the first cover portion. Preferably, the second cover portion comprises a substantially rectangular cover portion with a planar portion and a peripheral edge portion or lip extending around each of the four sides of the substantially rectangular cover portion. The peripheral edge portion of such embodiments is sized to receive the first cover portion, which may comprise an electronic device secured therein, in both an open and a closed position such that the peripheral edge extends angularly away from the planar portion and covers or receives at least a portion of each of the four sides of the first cover portion. Thus, when the first cover portion and any corresponding device provided therewith is provided in both a closed position (i.e. with a screen of the device provided directly adjacent the second cover portion) and an open position (i.e. with a screen of the device oriented outwardly with respect to the second cover portion), the peripheral edge portion of the second cover portion surrounds or covers the perimeter of the first cover portion and/or device. As shown and described herein, cases of the present invention comprise at least three positions of storage and/or use including, the aforementioned closed position with a screen of the device provided directly adjacent the second cover portion, a first open position with a screen of the device oriented outwardly with respect to the second cover portion and the screen of the device provided substantially parallel to the planar portion of the second cover portion, and a second open position wherein the first cover portion is provided at an acute angle with respect to the second cover portion.

Various devices provide for protective coverings for an electronic device, including U.S. Patent Application Publication No. 2013/0134061, which is incorporated by reference in its entirety herein. Such devices, however, fail to provide various features and benefits of the present invention including, for example, a second cover portion comprising a peripheral edge or lip for receiving and protecting a first cover portion or electronic device in at least two positions.

In one embodiment, a protective case for retaining, displaying, and storing an electronic device is provided, the case comprising a first cover portion hingedly interconnected to a second cover portion, said first cover portion comprising a first panel and a second panel, said first panel comprising a device-receiving portion and said second panel opposing said first panel, wherein said protective case provides for selective positioning of said first cover with respect to said second cover portion, said first cover portion positionable between at least: (i) a closed position, wherein the first panel is provided adjacent to said second cover portion; (ii) a first open position, wherein said first panel is rotated approximately 180 degrees about a longitudinal axis from said closed position; and (iii) a second open position, wherein said first cover portion is provided at an angle between approximately 15 degrees and approximately 90 degrees with respect to said second cover portion. The second cover portion comprises a planar portion adapted for covering and protecting a planar portion of the device, and a lip extending from said planar portion for receiving the first cover portion in at least one of the closed position and the first open position. As used herein, reference to a 180 degree rotation of one portion or cover of the case with respect to a second portion of the cover or case generally refers to "flipping" the relevant portion and is not limited to an exact 180 degree rotation. One of skill in the art will recognize that, particularly in embodiments where a support member is disposed under a portion of the first cover portion, a full 180 degree rotation may not be achieved or required in order to convert the case between open and closed positions and vice versa. Thus, 180 degree rotation and "approximately" 180 degree rotation should not be read as limiting and generally relates to the concept of converting a downward facing cover portion to an upward facing cover portion.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

The present invention has significant benefits across a broad spectrum of endeavors. It is the applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment of the method that illustrates the best mode now contemplated for putting the invention into practice is described herein by, and with reference to, the annexed drawings that form a part of the specification. The exemplary method is described in detail without attempting to describe all of the various forms and modifications in which the invention might be embodied. As such, the embodiments described herein are illustrative, and as will become apparent to those skilled in the arts, can be modified in numerous ways within the scope and spirit of the invention.

The detailed description is to be construed as exemplary only and does not describe every possible embodiment since describing every possible embodiment would be impractical, if not impossible. Numerous alternative embodiments could be implemented, using either current technology or technology developed after the filing date of this patent.

Embodiments of the present invention accommodate a wide variety of devices, such as an iPad®. While the embodiment illustrated is well suited for housing an iPad®, smaller and larger versions of the protective case are contemplated that are adapted for housing or protecting various devices, such as a Kindle®, a Galaxy®, a PlayBook®, an Android® tablet, an Iconia®, and various similar devices whether or not currently conceived of.

Figure 1:
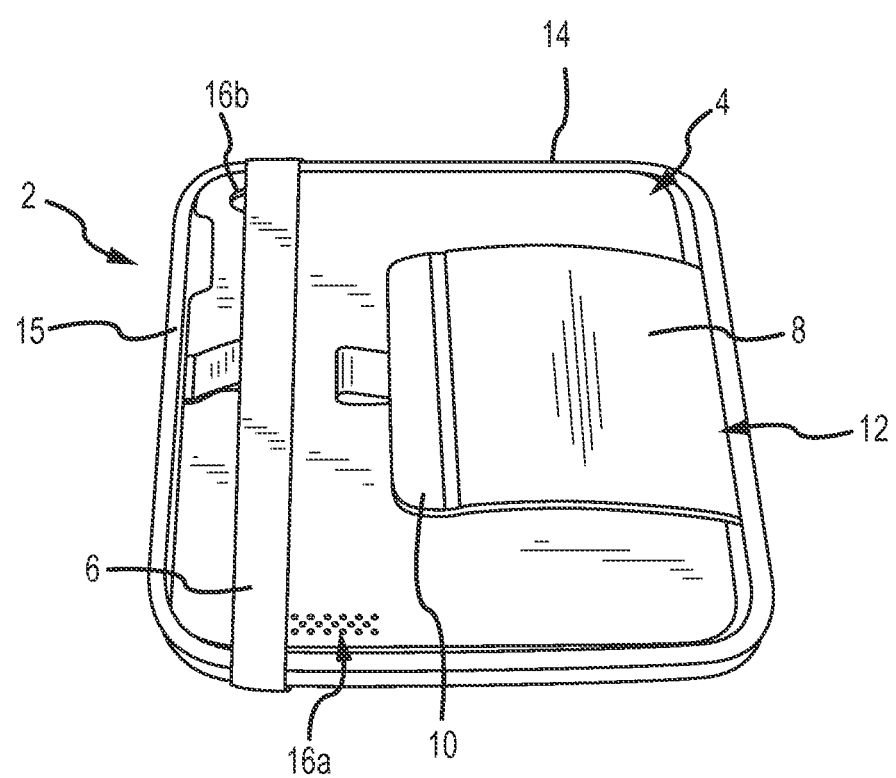
FIG. 1 is a front perspective view of a case according to one embodiment and provided in a first position.

FIG. 1 is a front perspective view of one embodiment of a case 2. The case 2 is provided in a closed position in FIG. 1. The case 2 comprises a first cover portion 4 for receiving and selectively securing an electronic device, such as a tablet computer, an e-reader or the like. The first portion 4, at least as shown in FIG. 1, substantially covers a back or rear portion of such a device (not shown in FIG. 1). As will be described herein, the case 2 comprises various features for revealing and/or displaying a front surface (e.g. a screen surface) of a device. FIG. 1, however, shows a closed, protected, and/or secured state of storage for such a device. The first cover portion 4 communicates with a second cover portion 14, the second cover portion 14 comprising a shell with a lip 15 and being slightly larger than the first cover portion 4 to provide a protective perimeter shell which surrounds at least one edge of the electronic device to provide impact protection if the device is dropped, for example. Both first 4 and second cover portions 14 are preferably formed of a substantially rigid material suitable for protecting an enclosed device. Suitable materials include, but are not limited to, EVA, polycarbonate, polypropylene, and various combinations thereof.

The case 2 comprises an elastic securing means 6 for aiding in securing the device in at least the position shown in FIG. 1. The case 2 further comprises a support member 8. In various embodiments, support member 8 is hingedly secured to the first cover portion 4 at one end 10 of the support member 8 and hingedly secured to second cover portion 14 at a second end 12 of the support member 8. In a preferred embodiment, the support member 8 comprises a first end and a second end, the first end being hingedly secured to the second portion at or proximal to a periphery of the second portion, and the second end of the support member 8 is hingedly secured to a side of the first portion. In various embodiments, the second end of the support member is hingedly secured to the first portion at a point in the middle third of a width of the first portion. In certain embodiments, the second end of the support member is hingedly secured to the first portion proximal a mid-point of a width of the first portion. Support member 8 thus allows first cover portion 4 to rotate with respect to second cover portion 14 about at least two parallel axes of rotation, the axes generally corresponding to hinges formed at the first and second ends 10, 12 of the support member. When provided in the screen-down, closed position of FIG. 1, support member 8 is disposed substantially flush with a rear surface of the first cover portion 4.

In certain embodiments, the case 2 comprises features 16a, 16b for accommodating audio-visual features of a stored device, such as speakers (16a) and camera equipment (16b). In various embodiments, the first cover portion comprises a first panel or side and a second opposing panel or side, the first cover portion 4 generally comprising a planar rectangular member with two sides or panels and both a length and a width being substantially greater than a thickness of the member as shown in the Figures.

Figure 2:
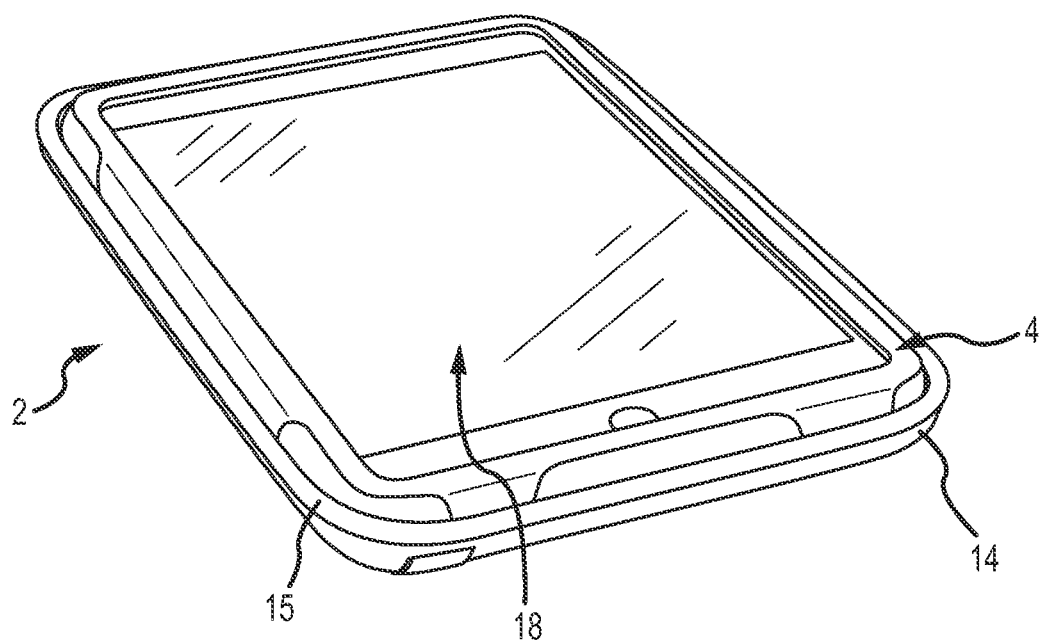
FIG. 2 is a front perspective view of a case according to the embodiment of FIG. 1 and provided in a second position.

FIG. 2 is a perspective view of the embodiment of FIG. 1 wherein the case 2 is provided in a screen-up or open position. As shown, an electronic device 18 is provided and secured with a first cover portion 4 of the case 2. The device 18 and first cover portion 4 are rotated approximately 180 degrees from the arrangement shown in FIG. 1 and with respect to the second cover portion 14. First cover portion 4 and associated device 18 are thus "nested" within the lip 15 of the second cover portion 14, and a screen or display surface of the device 18 is exposed for use (i.e. viewing, user contact, etc.). In FIGS. 1-5, a case 2 is provided for use with an iPad 18. Accordingly, the embodiment shown in FIGS. 1-5 and the various features provided therein are sized to secure an iPad of known dimensions. It will be expressly recognized, however, that the present disclosure is not limited to any particular device. Indeed, features and concepts of the present disclose may be employed with any number of devices, including, but not limited to, various sized tablets, smart-phones, and e-readers.

As shown in FIGS. 1-2, the second cover portion 14 comprises a lip 15 which receives the first cover portion 4 and any associated device 18. The second cover portion 14 and associated lip 15 receive first cover portion 4 and device 18 in a "nested" configuration, both when the device 18 is in a "screen-down" position (FIG. 1) and a "screen-up" position (FIG. 2). Rotation of the hinge members of support 8 allows for the device 18 and first portion 4 to be nested in the second portion 14 in both "screen-up" and "screen-down" arrangements, the two arrangements being approximately 180 degrees of rotation (about a longitudinal axis) apart.

In one embodiment, hinges of the support 8 comprise integral or stitched members with sufficient flexibility to allow for the described rotation. Accordingly, in various embodiments, first cover portion 4, support 8, and second cover portion 14 are hingedly interconnected and non-severable. Alternative embodiments, however, contemplate various connections between cover portions 4, 14 and support 8. Such connections include, but are not limited to, hook-and-loop connections, magnetic connections, snaps, etc., such that one or more of the components are selectively separable but still comprise the ability to rotate features as described herein.

Figure 3:
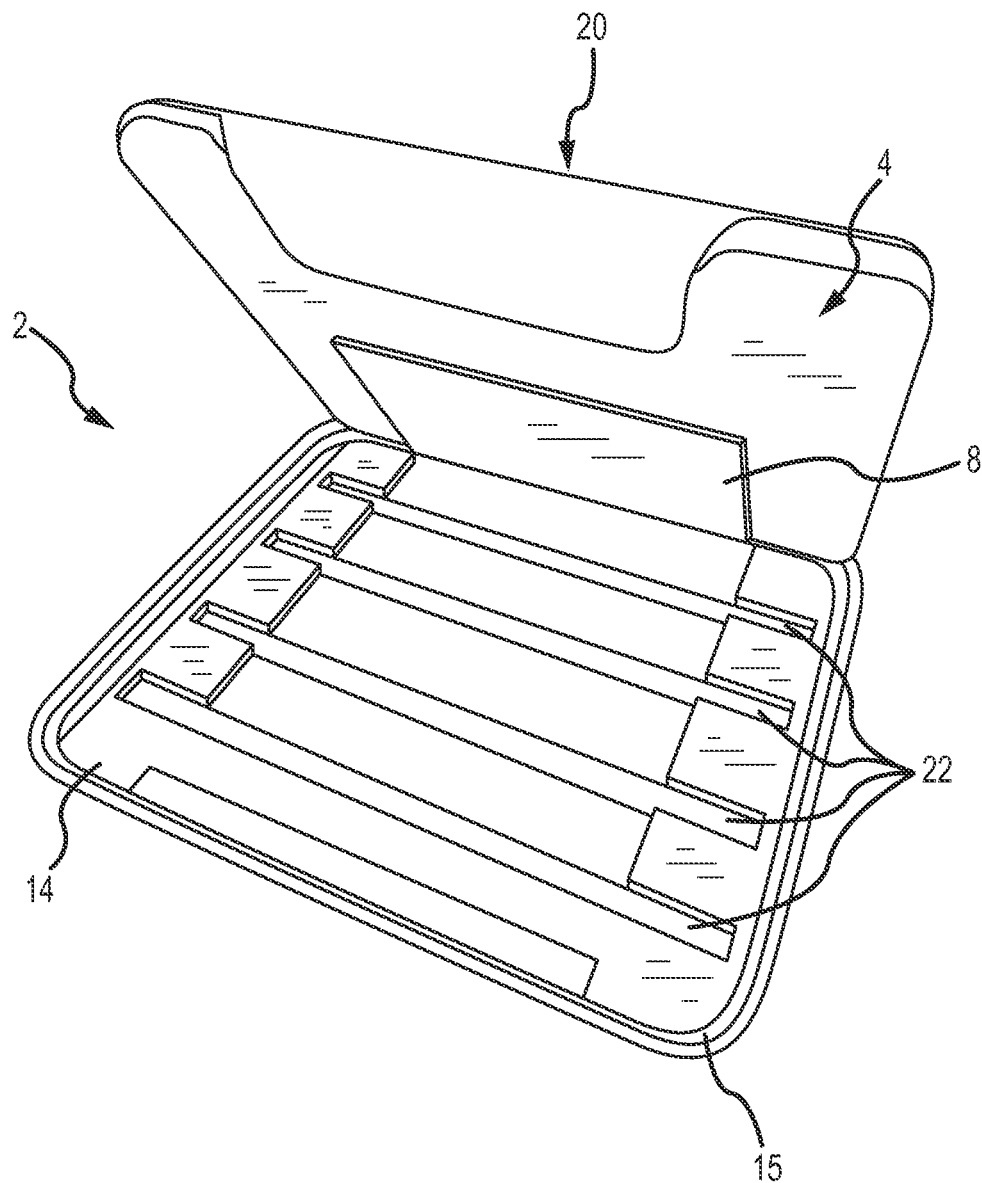
FIG. 3 is a perspective view of a case according to the embodiment of FIG. 1 and provided in a third position.

FIG. 3 is a perspective view of the case 2 according to FIGS. 1-2, wherein the first cover portion 4 is disposed at an angle with respect to the second cover portion 14. The position of the case 2 depicted in FIG. 3 may be considered a transition position, wherein the case 2 is between at least two of a closed position, an open position, and a propped-up position. The support member 8 is shown as being flush with a rear portion of the first cover portion 4. From the depicted position, a first edge 20 of the first cover portion 4 may be rotated downwardly (with respect to FIG. 3) about one end of the support member 8 and selectively received by at least of receiving portions 22 provided on an interior surface of the second cover portion 14. Each of the receiving portion 22 correspond to a different display angle of the first cover portion 4 and a corresponding device. Each of the plurality of receiving portions 22 and associated angular positions may be selected by a user based on user-preference. The support member 8 is provided in a non-supportive position in FIG. 3 (i.e. folded against the first cover portion 4). As will be shown and described herein, however, the first cover portion 4 is rotatable about the support member 8 such that a first edge 20 of the first cover portion 4 is received in a receiving portion and supported therein.

Figure 4:
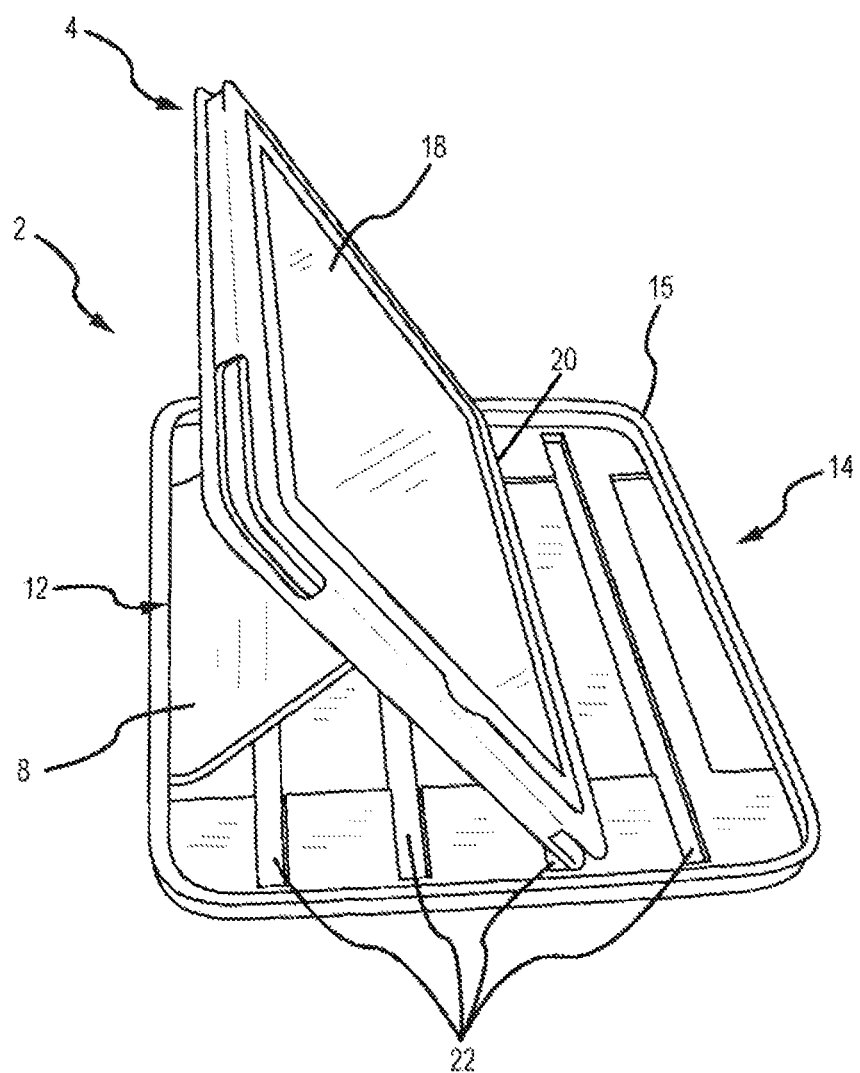
FIG. 4 is a perspective view of a case according to the embodiment of FIG. 1 and provided in a fourth position.

FIG. 4 shows the case 2, first cover portion 4 and associated device 18 disposed in an angled position of use. As discussed, support member 8 is secured at one end 12 to the second cover portion 14 of the case and further secured at a second end to the first cover portion 4. Both connections comprise hinged members to allow the cover first portion 4 and/or second cover portion 14 to rotate at least with respect to the support member 8. Additionally, at least a portion of the support member 8 comprises a substantially rigid member for supporting at least a portion of the weight of the first cover portion 4 and any associated device 18. One end 20 of the first cover portion 4 is disposed in one of a plurality of receiving portions 22 to further facilitate the support of the device 18 in an angled or partially-upright position.

Figure 5:
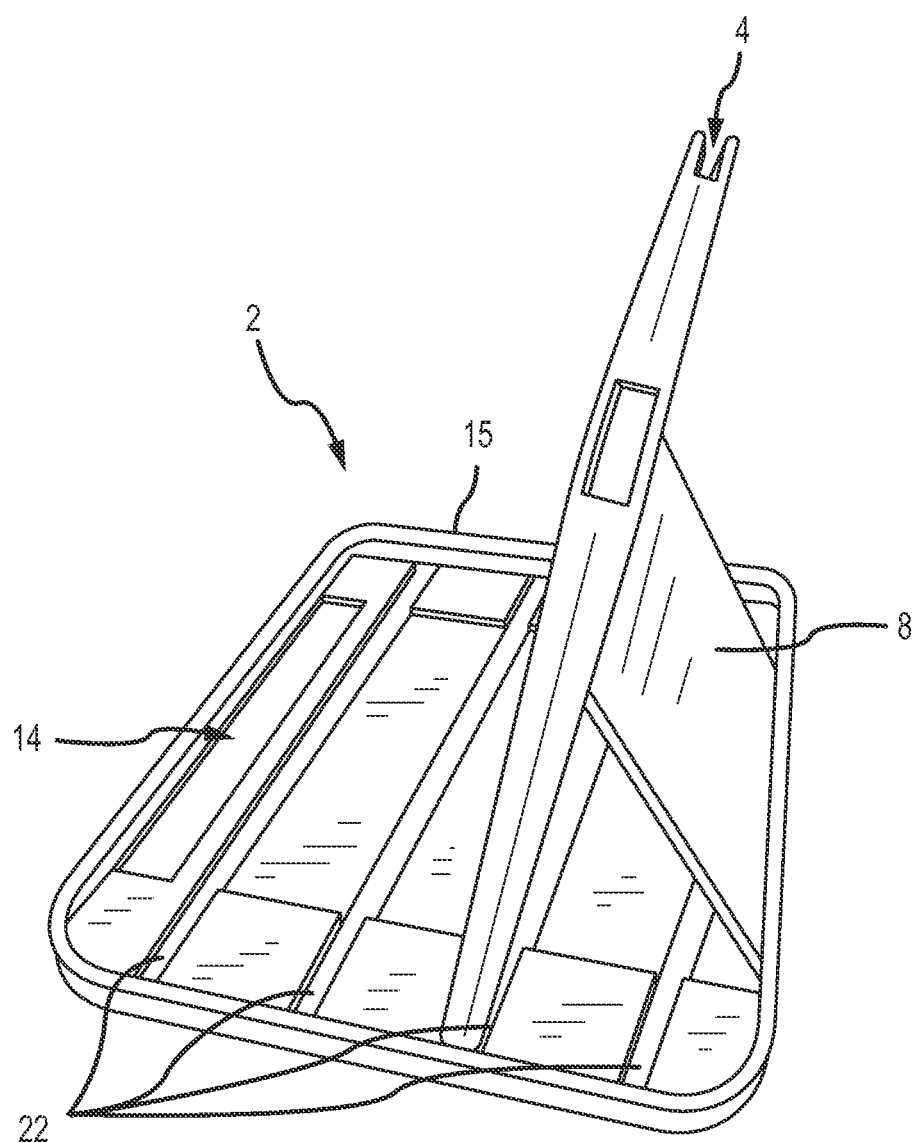
FIG. 5 is a perspective view of a case according to the embodiment of FIG. 1 and provided in a fifth position.

FIG. 5 provides an additional side perspective view of a case 2 disposed in an angled position of use. FIG. 5 is generally similar to FIG. 4, with the exception that the first cover portion 4 and associated device of FIG. 5 are disposed in a different receiving portion 22 such that the device is inclined at a greater angle with respect to the second cover portion 14. In various embodiments, receiving portions 22 are provided such that the first cover portion may be selectively positioned in any one of a plurality of predetermined positions between approximately 30 degrees and approximately 90 degrees with respect to the second cover portion.

Figure 6:
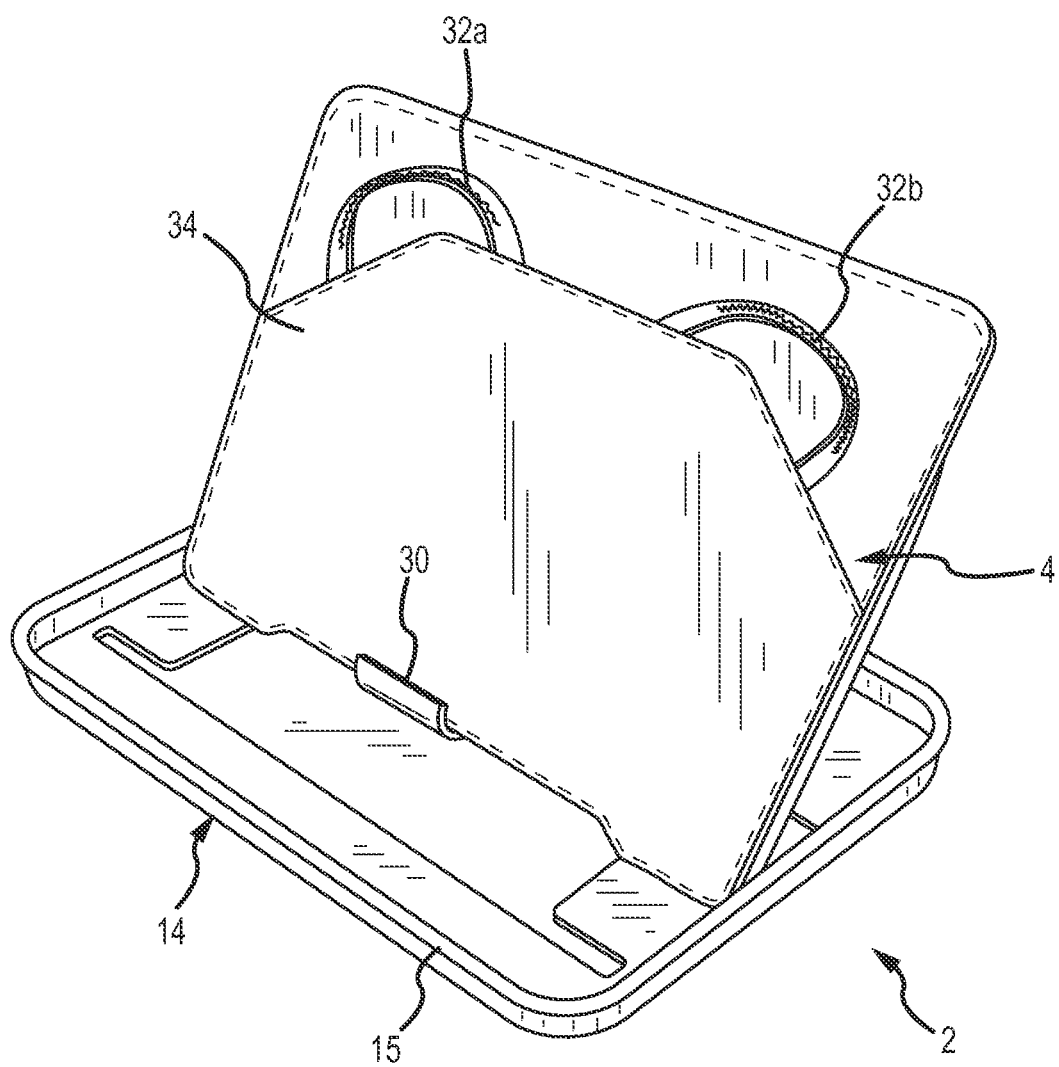
FIG. 6 is a perspective view of a case according to one embodiment of the present invention.

FIG. 6 is a perspective view of a case according to one embodiment of the present invention. FIG. 6 shows the case 2 and with a first cover portion 4 disposed in an angled position of use. Various retaining means, including those shown and described in U.S. patent application Ser. No. 13/722,167, filed Dec. 20, 2012 and incorporated by reference in its entirety herein, are contemplated for use with the present invention.

FIG. 6 depicts one embodiment of a protective case comprising elastic securing means. The elastic securing means of the depicted embodiment comprise elastic loops 32a, 32b for engaging a corner or other portion of an electronic device. As shown, the elastic straps 32a, 32b are provided and stitched or secured to a panel 34. The panel 34 preferably comprises a non-abrasive material for receiving an electronic device. However, it should be expressly recognized that elastic securing means 32a, 32b of the present invention may be provided in any number or arrangements. Additionally, the present invention is not limited to two elastic securing means as shown in FIG. 6. Indeed, any number of geometrical arrangements may be provided in accordance with the present invention.

The embodiment of FIG. 6 further comprises a substantially rigid member 30. The substantially rigid member 30 comprises at least one of a clip, hook, loop, projection, post, recession, etc. for receiving a portion of an electronic device and that generally opposes a force applied to the electronic device by the loops 32a, 32b. In FIG. 6, the substantially rigid member 30 is depicted as being provided generally in the center of a length of the panel 34. It will be recognized, however, that the placement of the substantially rigid portion 30 is not critical, so long as it is appropriately positioned so as to resist the force applied by the elastic members and secure a device.

Figure 7:
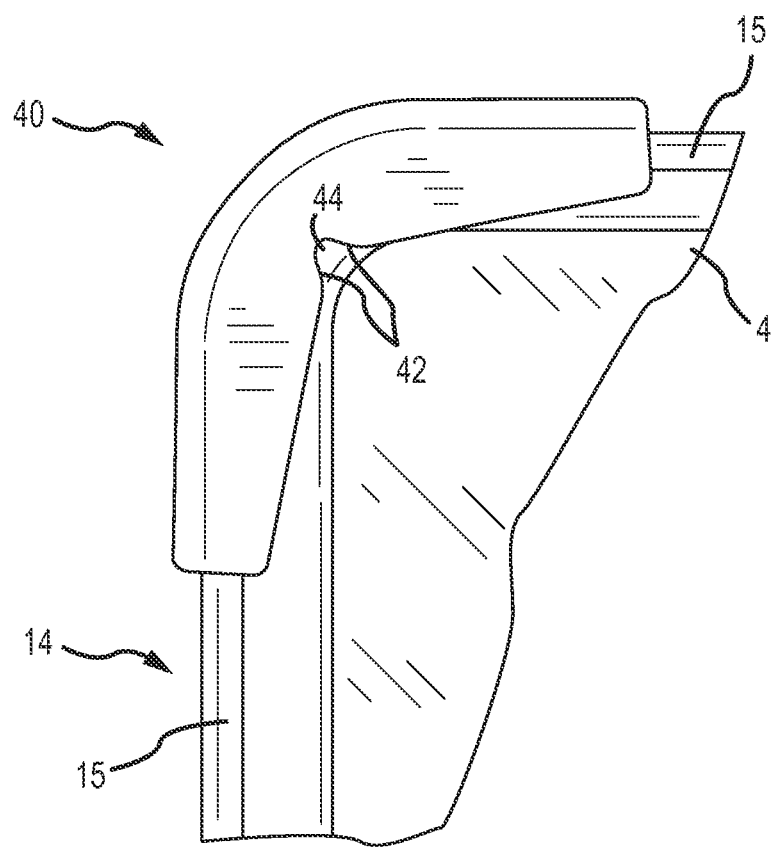
FIG. 7 is a front perspective view of a portion of a case according to one embodiment of the present invention.

FIG. 7 is a front elevation view of a second cover portion 14 comprising securing means for the first cover portion 4. In the depicted embodiment, the securing means comprise resilient extensions 40, such as rubber flap or extension members. The resilient extensions 40 are deformable to selectively secure and release respective corners of the first cover portion 4, which is shown as secured within the second cover portion 14 and in the closed position in FIG. 7. In certain embodiments, the resilient extensions 40 are secured to or proximal a lip 15 of the second cover portion 14 and extending into an area defined by a perimeter the lip 15 of the second cover portion 14. The resilient extensions 40 secure the first cover portion 4 in both an open (see FIG. 2) and closed (see FIG. 1) positions. Preferably, a user-applied force is sufficient to remove the first cover portion from either of an open and a closed position.

In various embodiments, the resilient extensions 40 extend into an internal area of the second cover portion 14 and comprise a curvilinear shape. In the depicted embodiment, the curvilinear shape comprises a pair of inflection points 42 bordering a recess 44. The inflection points 42 further comprise points of maximum extension into the area or volume defined by the second cover portion 14. In certain embodiments, the inflection points extend between approximately 1 and 10 mm from a respective edge or lip 15 of the second cover portion 14. In preferred embodiments, the inflection points extend between approximately 3 and 8 mm from a respective edge or lip 15 of the second cover portion 14. In a more preferred embodiment, the inflection points extend between approximately 6 mm from a respective edge or lip 15 of the second cover portion 14. It will be recognized, however, that devices of the present invention are not limited to any particular size, and thus resilient extensions 40 are not limited to any particular dimensions. That is, devices of the present invention are contemplated as being sized to receive any number of devices, including relatively small smartphones and larger tablet devices. Accordingly, it is further contemplated that resilient members 40 will scale based on the size of the case and device contemplated by a particular embodiment.

The resilient extensions 40 comprise the combination of inflection points 42 and the recess 44 to provide for sufficient flexibility of the extension 40 when inserting and/or removing a device. Recess 44 increases flexibility of the extension 40, while inwardly-extending inflection points provide for sufficient coverage and securing of a device and/or first cover portion 4 to be held within the second cover portion 14.

In certain embodiments, the extension members 40 are provided in at least two corners of the case 2. In preferred embodiments, an extension 40 is provided in each of the four corners of the case 2. Extensions 40 may be glued to the second cover portion 14, which may comprise EVA or a similar material.

In a preferred embodiment, a protective case of the present invention comprises a plurality of elongated ridges, indentions, indentations, or slots, each of the elongated ridges or slots corresponding to a predetermined angle at which a contained-device may be situated. While various embodiments contemplate that the case and device may be maintained at a desired position based on the weight and geometry of the case, slots, and/or device, it is further contemplated that additional securing features may be provided. Additional securing features include, but are not limited to Velcro®, magnets, snaps, rubber grips, and various similar features as will be recognized by one of skill in the art.

What is claimed is:

1. A protective case for an electronic device, the protective case comprising:
    a first cover portion hingedly interconnected to a second cover portion by a support member, the support member comprising a substantially rigid portion, a first hinge interconnected to said first cover portion, and a second hinge interconnected to said second cover portion;
    said first cover portion comprising a first side and a second side, said first panel side comprising a device-receiving portion and said second side opposing said first side, a substantially rigid portion extending from said first cover portion, and at least one biasing member in force-transmitting communication with said first cover portion for providing a biasing force toward said substantially rigid portion;
    the support member comprising a first end and a second end, the first end hingedly secured to said second cover portion at a periphery of the second cover portion, and the second end hingedly secured to said first cover portion proximal to a mid-point of a width of the second side;
    said second cover portion comprising a plurality of receiving portions, wherein each of said receiving portions corresponds to a predetermined display angle for said first cover portion; and
    wherein said protective case provides for selective positioning of said first cover portion between at least: (i) a closed position, wherein the first side is provided adjacent to said second cover portion; (ii) a first open position, wherein said first side is rotated approximately 180 degrees about a longitudinal axis from said closed position; and (iii) a second open position, wherein said first cover portion is provided at an angle with respect to said second cover portion; and
    the second cover portion comprising a planar portion and a peripheral edge portion comprising a lip extending from said planar portion of said second cover portion for receiving the first cover portion in the closed position and the first open position; and
    an elastic securing member for securing the protective case in at least the closed position.

2. The protective case of claim 1, wherein said receiving portions comprise channels in said second cover portion.

3. The protective case of claim 1, wherein said receiving portions comprise projections in said second cover portion.

4. The protective case of claim 1, wherein the substantially rigid portion comprises at least one of a clip, a hook, a loop, a projection, and a post.

5. The protective case of claim 1, wherein said lip extends along the substantial entirety of a perimeter edge of the second cover portion.

6. A protective case for an electronic device, the protective case comprising:
    a first cover portion hingedly interconnected to a second cover portion;
    said first cover portion comprising a first side and a second side, said first side comprising a device-receiving portion and said second side opposing said first side;
    a substantially rigid portion extending from said first cover portion, and at least one biasing member in force-transmitting communication with said first cover portion for providing a biasing force toward said substantially rigid portion;
    a support member comprising a first end and a second end, the first end hingedly secured to said second cover portion at a periphery of the second cover portion, and the second end hingedly secured to said first cover portion proximal to a mid-point of a width of the second side;

wherein said protective case provides for selective positioning of said first cover with respect to said second cover portion, said first cover portion positionable between at least: (i) a closed position, wherein the first side is provided adjacent to said second cover portion; (ii) a first open position, wherein said first side is rotated approximately 180 degrees about a longitudinal axis from said closed position; and (iii) a second open position, wherein said first cover portion is provided at an angle between approximately 15 degrees and approximately 90 degrees with respect to said second cover portion; and the second cover portion comprising a planar portion adapted for covering and protecting a planar portion of the device, and a lip extending from said planar portion of said second cover portion along the substantially entirety of a perimeter edge of the second cover portion for receiving the first cover portion in at least one of the closed position and the first open position; and wherein the support member is provided between the first cover portion and the second cover portion when the protective case is provided in said closed position and wherein said first cover portion is provided within a volume defined by said second cover portion and said lip.

7. The protective case of claim 6, wherein said receiving portions comprise channels in said second cover portion.

8. The protective case of claim 6, wherein said receiving portions comprise projections on said second cover portion.

9. The protective case of claim 6, wherein said at least one biasing member comprises a resilient loop adapted to engage a corner of an electronic device.

10. A protective case comprising:
a first cover portion having a first side and a second side, said first side comprising means for retaining an electronic device;
a second cover portion sized to receive said first cover portion in at least a first position and a second position;
said first position comprising a closed position, wherein said means for retaining an electronic device are provided adjacent to said second cover portion;
said second position characterized in that said means for retaining an electronic device are rotated approximately 180 degrees about a longitudinal axis from said first position; and
the second cover portion comprising a planar portion and a lip extending from said planar portion of said second cover portion for receiving the first cover portion in the first position and the second position; and
wherein said first cover portion is provided within a volume defined by said second cover portion and said lip when said first cover portion is provided in said second position and wherein said first side of said first cover portion, said second side of said second cover portion, and said planar portion of said second cover portion are provided substantially parallel when said protective case is provided in said second position.

11. The protective case of claim 10, further comprising a support member having a first end and a second end, the first end hingedly secured to said second cover portion at a periphery of the second cover portion, and the second end hingedly secured to said first cover portion proximal to a mid-point of a width of the first cover portion.

12. The protective case of claim 10, wherein said means for retaining an electronic device comprise at least one elastic member.

13. The protective case of claim 10, wherein said second cover portion comprises a plurality of channels for receiving an edge of said first cover portion and providing said first cover portion at an acute angle with respect to the second cover portion.

14. The protective case of claim 10, wherein said means for retaining an electronic device comprise a substantially rigid support member and at least one biasing member in force-transmitting communication with said first cover portion.

15. The protective case of claim 10, wherein said lip extends along the substantial entirety of a perimeter edge of the second cover portion.

* * * * *